Oct. 8, 1968
H. DRECHSEL ETAL  3,404,956
PROCESS FOR CATALYTIC CONVERSION OF DILUTE SULFUR DIOXIDE
GASES TO SULFUR TRIOXIDE AND SULFURIC ACID
Original Filed Nov. 14, 1963
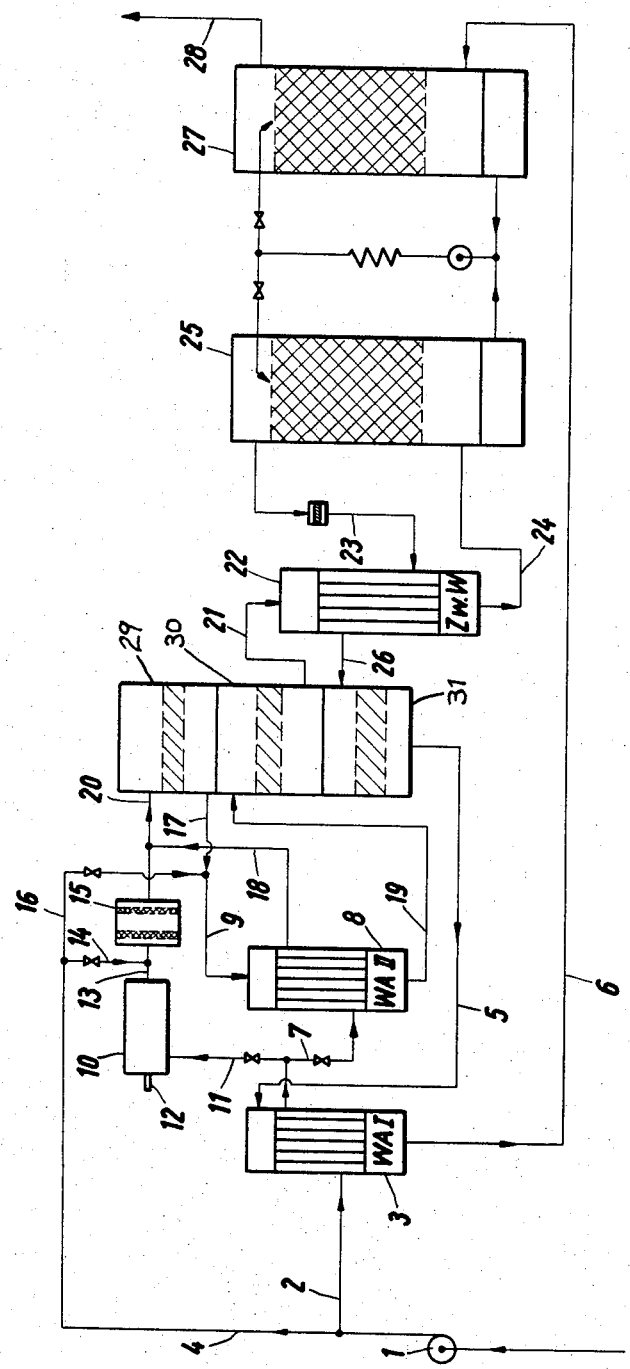
*Inventor:*
Herbert Drechsel
Karl-Heinz Dörr
Hugo Grimm
By Bailey, Stephens & Huettig
*Attorneys*

United States Patent Office 3,404,956
Patented Oct. 8, 1968

3,404,956
PROCESS FOR CATALYTIC CONVERSION OF DILUTE SULFUR DIOXIDE GASES TO SULFUR TRIOXIDE AND SULFURIC ACID
Herbert Drechsel, Karl-Heinz Dorr, and Hugo Grimm, Frankufurt am Main, Germany, assignors to Metallgesellschaft Aktiengesellschaft, Frankfurt am Main, Germany
Continuation of application Ser. No. 323,659, Nov. 14, 1963. This application Dec. 28, 1966, Ser. No. 605,500
Claims priority, application Germany, Nov. 16, 1962, M 54,831
6 Claims. (Cl. 23—168)

ABSTRACT OF THE DISCLOSURE

Gases having a total $SO_2$ content of less than 9% after being admixed with a small portion of hot, $SO_2$ rich gas are catalytically oxidized to $SO_3$ and sulfuric acid using a plurality of heat exchange steps and oxidation steps and an intermediate $SO_3$ absorption step in a process which is self sufficient as to sensible heat requirements since heat losses experienced during the intermediate absorption step are compensated for by heat generated during the oxidation steps and by the heat supplied by the hot, $SO_2$ rich gas.

---

This application is a continuation of Ser. No. 323,659, filed Nov. 14, 1963, and now abandoned.

This invention relates to an improved catalytic process for preparing and recovering sulfur trioxide, $SO_3$, and/or sulfuric acid employing starting gases containing small quantities of sulfur dioxide of, for example, about 3 to 6 vol. percent sulfur dioxide.

It is known to convert sulfur dioxide containing gases catalytically with oxygen to sulfur trioxide in either dry or wet processes. In wet processes the resulting sulfuric acid concentration, determined by the water content of the starting gases, is frequently too low for commercial purposes. It is also known to avoid this disadvantage by adding dry sulfur dioxide gases to the wet sulfur dioxide containing gases to be converted. For example, gases from burned sulfur can be added in such amounts that the desired sulfur dioxide to water ratio is produced.

Also, intermediate cooling of the partially converted gases from the first stage of the process in a heat exchanger is known. For example, the process may be carried out in such a manner that the relatively cool sulfur dioxide gases entering at 50° C. are preheated to about 320 to 340° C. in an initial heat exchanger by heat exchange with the catalyzed gases present from the last catalytic stage of the process and are further heated by heat exchange with the precatalyzed gases from the first catalytic stage to the initiating temperature of the conversion.

Also, a process is known wherein the degree of conversion during the catalysis is increased by removing the sulfur trioxide formed from the starting gases by absorption between the individual catalyst stages in order that the equilibrium is displaced. Due to the high sulfur dioxide to sulfur trioxide ratio in the last stage, in comparison with other processes, a very high degree of conversion, up to 99.5%, can be attained in the last catalyst stage. This process, however, as was found, is better, from the standpoint of technical efficiency, only for the conversion of relatviely rich sulfur dioxide gases, that is, such as those that have about 9% sulfur dioxide or more. The intermediate absorption causes considerable heat loss, i.e., in the total system, which lowers the exhaust temperature of the final converted gases to such a low point that the heat content of these gases can only be utilized for heating the starting sulfur dioxide gases to conversion initiating temperatures by employing a heat exchanger of uneconomically large dimensions. For example, employing 6% sulfur dioxide gas the final gas of the last stage leaves the final catalyst at a temperature of 420° C.

In order to heat starting gases containing 6% sulfur dioxide which are at 50° C., with the final gases and the precatalyzed gases from the first catalyst stage to the initiating temperature of 420 to 440° C. in two heat exchangers a total heat exchanger surface of 2020 square meters is necessary, 1800 square meters for the first heat exchanger and 220 square meters for the second heat exchanger. This is for a plant of up to 100 metric tons of monohydrate capacity per day. Whereas, for converting the same gases without the intermediate absorption of sulfur trioxide a total heat exchange surface of only 700 square meters is necessary, namely, 400 square meters for the first heat exchanger and 300 square meters for the second. Suitably the second heat exchanger is subdivided into two or more units so that the temperature level in each stage can be maintained at the optimum value.

For this reason, the process having an intermediate absorption of sulfur trioxide has been employed only for gases containing at least 9% sulfur dioxide. If more dilute gases were to be employed, these were first concentrated to at least 9% sulfur dioxide, for example, by the addition of richer sulfur dioxide gases, such as, sulfur combustion gases.

This expedient is undesirable in many cases, however, because it not only requires the supplemental use of considerable amounts of relatively expensive raw materials, as elemental sulfur, but also makes a production increase necessary for which often no ready market exists. In this connection it must be borne in mind that the processing of dilute sulfur dioxide gases is customarily only a secondary process of another plant and whose function primarily consists of making troublesome sulfur dioxide containing exhaust gases unharmful and that such process at least causes no loss, and if possible a small income. The necessary enlargement of the plant for such a secondary process caused by an increase in capacity usually does not pay off and it often is difficult to find an adequate market for the resulting byproducts.

The present invention accordingly concerns an improved process for producing sulfur trioxide which overcomes disadvantages of these known processes. The process of the invention enables the production of sulfur trioxide employing dilute starting sulfur dioxide gases containing very low concentrations of sulfur dioxide, for example, down to about 3% sulfur dioxide, in the process employing an intermediate absorption of formed sulfur trioxide without the requirement of adding substantial amounts of gases having high concentrations of sulfur dioxide to the starting gas, that is, without significantly enlarging the plant and production capacity. For example, the process of the invention enables the operation of a 100 metric ton per day monohydrate plant in such a manner that the starting gases containing about 6% sulfur dioxide need not be enriched to 9%, as heretofore was necessary, but only to 6.8% sulfur dioxide. This means a production increase of 100 to 114 metric tons per day rather than, as heretofore necessary, a production increase to 150 tons per day.

The accompanying drawing diagrammatically illustrates an apparatus suitable for carrying out the process of the invention, reference being made thereto in the following description.

The above advantages are obtained by the arrangement of the initial heat exchanger 3, shown in the accompanying drawing, of the process, wherein the total heat of the final catalyzed gases which leave the last catalyst stage of the process is used to heat only a part of the stream of incoming sulfur dioxide gases. This initial heat exchanger is suitably arranged so that the temperature of the sulfur trioxide exhausted from the heat exchanger is about the same temperature as the sulfur trioxide has in the process without intermediate absorption, that is, about 200 to 220° C., preferably about 210° C.

The partial stream of sulfur dioxide gases heated to the temperature obtainable in the initial heat exchanger, for example, to 280° C. with the treatment of gases containing about 6% sulfur dioxide, is heated to about the reaction initiating temperature in a second heat exchanger 8 in the accompanying drawing, by heat exchange with the hot precatalyzed gases from the first catalyst stage. The oxygen content of the starting sulfur dioxide gas is sufficient not only for the burning of the relatively small amount of sulfur added according to the invention but also for converting the total amount of sulfur dioxide. Preferably a part of the starting gas which bypasses the initial heat exchanger is fed to a sulfur furnace 10 in place of air.

Such an amount of sulfur is burned in this sulfur furnace that the resulting heat of combustion together with the increase of heat of oxidation of sulfur dioxide to sulfur trioxide effected by concentrating the gas stream is sufficient to compensate for the heat loss caused by the intermediate absorption. According to the invention this heat deficiency is not exclusively compensated by an increase in heat of oxidation developed upon catalysis (by plant enlargement), but predominantly balanced by the heat of combustion of the sulfur.

According to the process of the invention, 3.5 kilograms of sulfur per 1000 normal cubic meters of sulfur dioxide containing gas are burned for each percent that the sulfur dioxide is below 9%. This brings the sulfur dioxide content up to the required minimum content.

The gas leaving the sulfur furnace having a high temperature and somewhat increased sulfur dioxide content is combined with part of the stream of starting sulfur dioxide gases not carried through the initial heat exchanger and treated in a known manner according to the process with intermediate absorption.

A particular advantage of the process of the invention is that the same conversion efficiency or output can be achieved, especially in treating dilute sulfur dioxide gases, that is, those containing about 3 to 6% sulfur dioxide, with three catalyst stages as heretofore was achieved with four catalyst stages. This corresponds to a savings of 20 to 25% in the amount of catalyst employed.

The process according to the invention is described with particular reference to the accompanying drawing in the following example.

The example illustrates the adaptation of the process to the conversion of gases containing about 6% sulfur dioxide with a plant having a capacity of 100 metric tons of monohydrate per day.

Example 1

The sulfur dioxide containing gas, at 50° C., was forced by blower 1 for the most part through line 2 into heat exchanger 3 and a lesser part was forced through line 4. In the present case of the total amount of 15,800 normal cubic meters per hour of starting gas, 11,900 normal cubic meters were passed to heat exchanger 3 and 3,900 normal cubic meters per hour were passed through line 4. In heat exchanger 3, which has an effective exchange surface of only 340 square meters, the sulfur dioxide gas was preheated to 280° C. by heat exchange with the hot sulfur trioxide gas at 420° C. from the last catalyst stage 31 which entered through line 5. The sulfur trioxide gas was thereby cooled to 210° C. and was sent into the final absorption step through line 6.

The major part of the sulfur dioxide gas preheated to 280° C., namely, 10,120 normal cubic meters per hour, was carried through line 7 into the second heat exchanger 8, in which it was heated to the conversion initiating temperature of about 430° C. by heat exchange with the hot gases admitted through line 9. A smaller part of the sulfur dioxide gas preheated in heat exchanger 3, 1780 normal cubic meters per hour, was admitted to the sulfur furnace 10 through line 11 and used for combustion in place of air. In the sulfur furnace 187 kilograms per hour of elemental sulfur were burned in burner 12. The gas, heated to 900° C. by the combustion of the sulfur, was passed through line 13 and combined with a part of the incoming stream of sulfur dioxide gas which had not been preheated in heat exchanger 3, namely, 2400 normal cubic meters per hour, and which was introduced through line 14. As a result, the temperature of the resulting mixture was again reduced to 440° C. At this temperature the mixture can be passed through gas filter 15, otherwise a particular construction or material must be used. The purpose of the gas filter 15 is to retain possible impurities which were brought in through the burning of the sulfur. The gas filter can obviously be omitted if sufficiently pure sulfur dioxide gas exists. The remaining part of the cool sulfur dioxide starting gas, 1500 normal cubic meters per hour, was passed through line 16 and combined with the precatalyzed gas coming from the first catalyst stage 29 through line 17. The resulting gas mixture had a temperature of 550° C., was passed through line 9 into the second heat exchanger 8, and there cooled to about 460° C., that is, cooled to about the starting temperature for the second catalyst stage. The gas was then passed into the second stage of the catalyst unit 30.

The sulfur dioxide gas heated to 430° C. in the second heat exchanger 8 was passed through line 18 and combined with the sulfur dioxide gas coming from the gas filter 15, both gases being at practically the same temperature. The mixture was then passed through line 20 into the first stage 29 of the catalyst unit.

The precatalyzed gas heated to about 500° C. was passed from the second catalyst stage 30 through line 21 into the intermediate heat exchanger 22 in which it was cooled to about 195° C. by heat exchange with the gas freed of sulfur trioxide from absorber 25 admitted through line 23. The precatalyzed gas was then passed into the first absorber 25. In this absorber the sulfur trioxide was washed out or removed in a known manner by spraying with relatively cool acid at, for example, 70° C.

The intermediate heat exchanger 22 had a heat exchange surface of 720 square meters. This was adequate to heat the gas freed of sulfur trioxide, which entered at a temperature of 70° C. to 400° C. At this temperature it was passed back through line 26 into the final stage 31 of the catalyst unit. The final gas from the catalysis, precooled to 210° C. in the first heat exchanger 3, was likewise in a known manner freed of its sulfur trioxide in the second absorber 27 by spraying with cool acid and then exhausted through line 28 to the atmosphere.

The process according to the invention is also applicable for gases having lower sulfur dioxide content. Thus, for example, gases containing 5% sulfur dioxide were treated in a similar manner wherein the amount of sulfur burned in the sulfur furnace was sufficient to increase the sulfur dioxide content to about 6.1% and the yield of 100 metric tons per day was increased to about 121 metric tons per day. When starting gas containing 4% sulfur dioxide was employed sufficient sulfur was burned to raise the sulfur dioxide content to 5.15% resulting in a yield of 129 metric tons per day of monohydrate.

We claim:
1. In a process for catalytic conversion of gases containing variable quantities of less than 9% $SO_2$ to an oxidation product selected from the group consisting of $SO_3$, sulfuric acid and mixtures thereof, wherein $SO_2$ containing cool starting gases are purified, dried and then preheated by indirect heat exchange with hot $SO_3$ containing gases before conversion; wherein the resulting preheated $SO_2$ containing gases are catalytically oxidized in initial and final oxidation stages; wherein $SO_3$ formed in the initial oxidation stage is absorbed in an intermediate absorption; wherein $SO_3$ formed in the initial oxidation stage is cooled before entrance into the intermediate absorption in an intermediate heat exchange step by indirect heat exchange with gases from the intermediate absorption; and wherein $SO_3$ formed in the final oxidation stage is absorbed in a final absorption, the improvement comprising in combination:

(a) admixing hot sulfur dioxide rich gas obtained in the combustion of elemental sulfur with the starting sulfur dioxide containing gas after preheating to produce a gas mixture the sulfur dioxide content of which is below 9%, (b) the sum of the heat of combustion of elemental sulfur and the heat of oxidation of the sulfur dioxide being at least equal to the heat loss caused by said intermediate absorption, (d) the heat required in the total process being supplied only by the combination of heat exchange of materials within the system and said heat of combustion of elemental sulfur.

2. A process as in claim 1 wherein the quantity of sulfur burned amounts to 3–4 kilograms for each 1000 normal cubic meters of starting sulfur dioxide gas for each percentage the sulfur dioxide content of such starting gas is below 9%.

3. A process as in claim 1 wherein three catalyst stages are employed to convert the starting sulfur dioxide gas to the oxidation product.

4. A process as in claim 1 wherein the starting gas has a sulfur dioxide content of about 3–6%.

5. A process as in claim 1 wherein part of the starting gases are preheated by indirect heat exchange with oxidized gases from the final oxidation stage and then employed as a source of oxygen for said combustion of elemental sulfur.

6. A process as in claim 1 wherein (a) part of the starting gases are preheated by indirect heat exchange with oxidized gases from the final oxidation stage and then employed as a source of oxygen for said combustion of elemental sulfur, and (b) wherein part of said purified and dried cool starting gases are admixed with gases from the initial oxidation stage and the resulting admixture employed as an indirect preheating medium for part of the purified and dried cool starting gases.

References Cited

UNITED STATES PATENTS 1,650,358  11/1927  Howard _____ 23—179
3,142,536  7/1964  Guth et al. _____ 23—175

OTHER REFERENCES

Fairlie: "Sulfuric Acid Manufacture," Reinhold Publishing Co. (1936), pp. 113 and 114.

OSCAR R. VERTIZ, *Primary Examiner.*

A. J. GREIF, *Assistant Examiner.*